(12) United States Patent
Vlaming et al.

(10) Patent No.: US 11,167,926 B2
(45) Date of Patent: Nov. 9, 2021

(54) RETAINMENT ASSEMBLY

(71) Applicant: Driessen Aerospace Group N.V., Alkmaar (NL)

(72) Inventors: Paul Cornelis Vlaming, Alkmaar (NL); Maxim Smulders, Alkmaar (NL)

(73) Assignee: DRIESSEN AEROSPACE GROUP N.V., Alkmaar (NL)

( * ) Notice: Subject to any disclaimer, the term of this patent is extended or adjusted under 35 U.S.C. 154(b) by 0 days.

(21) Appl. No.: 16/626,503

(22) PCT Filed: Jul. 17, 2019

(86) PCT No.: PCT/US2019/042250
§ 371 (c)(1),
(2) Date: Dec. 24, 2019

(87) PCT Pub. No.: WO2020/018698
PCT Pub. Date: Jan. 23, 2020

(65) Prior Publication Data
US 2021/0122471 A1    Apr. 29, 2021

Related U.S. Application Data

(60) Provisional application No. 62/699,616, filed on Jul. 17, 2018.

(51) Int. Cl.
*B65G 1/14* (2006.01)
*B64D 11/04* (2006.01)
*A47F 1/12* (2006.01)

(52) U.S. Cl.
CPC ............... *B65G 1/14* (2013.01); *A47F 1/128* (2013.01); *B64D 11/04* (2013.01)

(58) Field of Classification Search
CPC ....... A47B 96/025; A47B 23/06; B64D 11/04; A47F 1/128; B65G 1/14
See application file for complete search history.

(56) References Cited

U.S. PATENT DOCUMENTS 1,900,760 A * 3/1933 Pendleton ............ A47B 96/025
  108/134
5,433,415 A * 7/1995 Samson ............... A47B 23/043
  248/448

(Continued)

FOREIGN PATENT DOCUMENTS

DE   102009039015 A1 * 3/2011 ............. A47B 49/00
FR       1163731 A  *  9/1958 ........... A47B 23/043

(Continued)

OTHER PUBLICATIONS

International Search Report and Written Opinion issued in PCT/US19/42250.

*Primary Examiner* — Stanton L Krycinski
(74) *Attorney, Agent, or Firm* — Jeffer Mangels; Butler & Mitchell LLP; Brennan C. Swain, Esq.

(57) ABSTRACT

A retainment assembly that includes a proximal retainer member that is movable between a first retracted position, a second retracted position and a deployed position, a distal retainer member that is movable between a retracted position and a deployed position. When the proximal retainer member moves from the deployed position to the first retracted position the distal retainer member does not move, and when the proximal retainer member moves from the deployed position to the second retracted position the distal retainer member moves from the deployed position to the retracted position.

15 Claims, 14 Drawing Sheets

(56) References Cited

U.S. PATENT DOCUMENTS

| | | | |
|---|---|---|---|
| 6,220,684 B1 | 4/2001 | Bent et al. | |
| 6,799,523 B1 * | 10/2004 | Cunha | A47F 5/0093 |
| | | | 108/108 |
| 7,255,376 B2 * | 8/2007 | Pratt | B64C 1/1469 |
| | | | 244/129.4 |
| 7,645,001 B2 * | 1/2010 | Harris | A47B 96/025 |
| | | | 312/205 |
| 9,199,738 B2 * | 12/2015 | Tan | B64D 11/04 |
| 9,403,603 B2 * | 8/2016 | Hozumi | B64D 11/04 |
| 10,087,664 B2 * | 10/2018 | Auriac | B64D 29/08 |
| 10,472,068 B2 * | 11/2019 | Coombs | F16B 5/0088 |
| 10,633,074 B2 * | 4/2020 | Seibt | B64D 11/02 |
| 2001/0013306 A1 | 8/2001 | Itakura et al. | |
| 2012/0111069 A1 * | 5/2012 | Padjen | E05C 5/04 |
| | | | 70/91 |
| 2014/0166806 A1 * | 6/2014 | Durand | B64D 11/04 |
| | | | 244/118.1 |
| 2014/0367974 A1 * | 12/2014 | Keely | E05B 65/0014 |
| | | | 292/60 |
| 2016/0290023 A1 * | 10/2016 | Boivin | B62B 5/0433 |
| 2018/0016011 A1 | 1/2018 | Burd et al. | |
| 2018/0163444 A1 * | 6/2018 | Hogg | B64D 11/0007 |
| 2019/0053641 A1 * | 2/2019 | Morad | A47B 96/025 |

FOREIGN PATENT DOCUMENTS

| | | | | |
|---|---|---|---|---|
| FR | 2465438 A1 * | 3/1981 | | A47B 23/06 |
| KR | 20080020147 | 3/2008 | | |
| WO | 2017191202 | 11/2017 | | |

* cited by examiner

RETAINMENT ASSEMBLY

CROSS REFERENCE TO RELATED APPLICATIONS

This application is a national stage application, filed under 35 U.S.C. § 371, of International Patent Application No. PCT/US19/42250, filed Jul. 17, 2019, which claims the benefit of U.S. Provisional Application No. 62/699,616, filed Jul. 17, 2018, the entireties of which are incorporated herein by reference.

FIELD OF THE INVENTION

The present invention relates generally a front-intermediate retainment system or retainment assembly for use in an aircraft galley.

BACKGROUND OF THE INVENTION

During meal service an intermediate retainer keeps the second or third row of equipment in place. This means that when a flight attendant wishes to use the second row of equipment he or she needs to remove both the front and intermediate retainment provisions and place them back when the equipment is stowed again. The current product includes an aluminum milled part which latches in both the horizontal and vertical position. By doing this the user not only receives tactile feedback but the retainer is also more secure in the new position.

The current intermediate retainer is often difficult to operate due to the small knob which has to be turned. It is also often difficult to visually see the difference between the locked and unlocked positions as the retainer itself is often out of view due to the positioning of or stowed rotable equipment. The front-intermediate retainment system invention described herein offers a solution, which includes a longer arm and the ability to operate the intermediate retainer with the front retainer.

SUMMARY OF THE PREFERRED EMBODIMENTS

In accordance with a first aspect of the present invention there is provided a retainment assembly that includes a proximal retainer member that is movable between a first retracted position, a second retracted position and a deployed position, and a distal retainer member that is movable between a retracted position and a deployed position. When the proximal retainer member moves from the deployed position to the first retracted position the distal retainer member does not move, and when the proximal retainer member moves from the deployed position to the second retracted position the distal retainer member moves from the deployed position to the retracted position. In other words, movement of the proximal retainer member from the deployed position to the first retracted position causes the distal retainer member to not move or remain stationary, and movement of the proximal retainer member from the deployed position to the second retracted position causes the distal retainer member to move from the deployed position to the retracted position.

In a preferred embodiment, the retainment assembly includes a surface. The surface can be the top or bottom of a shelf or container or the surface can be part of a wall. In the deployed position at least a portion of the proximal retainer member is positioned above the surface and in the first and second retracted positions the proximal retainer member is positioned below the surface. In the deployed position at least a portion of the distal retainer member is positioned above the surface and in the retracted position the distal retainer member is positioned below the surface. Preferably, the movement of the proximal retainer member between the first retracted, second retracted and deployed positions is rotational movement and the movement of the distal retainer member between the retracted position and the deployed position is rotational movement.

In a preferred embodiment, the retainment assembly includes a gear assembly and the proximal retainer member includes a rod that extends to the gear assembly. The gear assembly includes a first gear associated with the proximal retainer member and a second gear associated with the distal retainer member. In a preferred embodiment, the gear assembly further comprises a rack gear. When the proximal retainer member moves from the deployed position to the first retracted position the rack gear is not meshed with one of the first gear or the second gear and the distal retainer member remains in the deployed position. When the proximal retainer member moves from the deployed position to the second retracted position the rack gear is meshed with both the first gear and the second gear and the distal retainer member moves to the retracted position. In a preferred embodiment, when the proximal retainer member moves from the deployed position to the first retracted position the rack gear is meshed with the first gear and not the second gear and the distal retainer member remains in the deployed position and when the proximal retainer member moves from the deployed position to the second retracted position the rack gear is meshed with both the first gear and the second gear and the distal retainer member moves to the retracted position. In another preferred embodiment, when the proximal retainer member moves from the deployed position to the first retracted position the rack gear is meshed with the second gear and not the first gear and the distal retainer member remains in the deployed position and when the proximal retainer member moves from the deployed position to the second retracted position the rack gear is meshed with both the first gear and the second gear and the distal retainer member moves to the retracted position.

In a preferred embodiment, when the proximal retainer member moves from the deployed position to the first retracted position the first gear does not mesh with the second gear and the distal retainer member remains in the deployed position and when the proximal retainer member moves from the deployed position to the second retracted position the first gear meshes with the second gear and moves the distal retainer member from the deployed position to the retracted position.

In accordance with another aspect of the present invention there is provided a retainment assembly that includes a proximal retainer member that is movable between a first retracted position, a second retracted position and a deployed position, a distal retainer member that is movable between a retracted position and a deployed position, a gear assembly and a surface. The proximal retainer member includes a rod that extends to the gear assembly. The gear assembly includes a first gear associated with the proximal retainer member and a second gear associated with the distal retainer member. The rod extends beneath (adjacent or proximate to) the surface. In the deployed position at least a portion of the proximal retainer member is positioned above the surface and in the first and second retracted positions the proximal retainer member is positioned below the surface, and in the deployed position at least a portion of the distal retainer member is positioned above the surface and in the retracted position the distal retainer member is positioned below the surface. When the proximal retainer member rotates from the deployed position to the first retracted position the distal retainer member does not rotate and when the proximal retainer member rotates from the deployed position to the second retracted position the distal retainer member rotates from the deployed position to the retracted position.

In accordance with another aspect of the present invention there is provided a method of moving first and second objects that are positioned in first and second storage spaces (e.g., first and second standard containers that are position on a shelf in an aircraft galley). The method includes moving a proximal retainer member from a deployed position to a first retracted position where the distal retainer member remains in a deployed position, moving the first object out of the first storage space, moving the proximal retainer member to a second retracted position where the distal retainer member moves from the deployed position to a retracted position, and moving the second object out of the second storage space. The steps can be done in any order and at any time period (e.g., one step can be performed later than others).

In a preferred embodiment, the present invention connects the front retainer member with the intermediate or rear retainer member through a mechanism that couples the movement of the front and intermediate retainer members in one direction but disconnects them in the other. This means that when the front retainer is in the locked position the intermediate retainer is also locked. If, however, the front retainer is moved in one direction to an unlocked position, e.g., counter-clockwise, the intermediate retainer is also moved to the unlocked position. However, if the front retainer is moved in the other direction, e.g., clockwise, the intermediate retainer remains in the locked position. For ease of description, the front retainer member is referred to herein as the proximal retainer member and the intermediate or rear retainer member is referred to as the distal retainer member. These terms are used as they relate to a user of the system (e.g., a flight attendant). The proximal retainer member is positioned at the front of the galley and is proximate to the flight attendant. The distal retainer member is positioned farther away from the flight attendant than the proximal retainer member.

The coupling of the distal retainer member with the proximal retainer member to ensure the quality of the visual check of the galley improves handling of the distal retainer member due to better grip and improves the user experience of the galley as a whole.

A mechanical working principle has been selected and fitted within the space envelope available for standard unit retainment solutions. The invention can also be utilized on the trolley compartment and in other places where multiple retainers are utilized.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
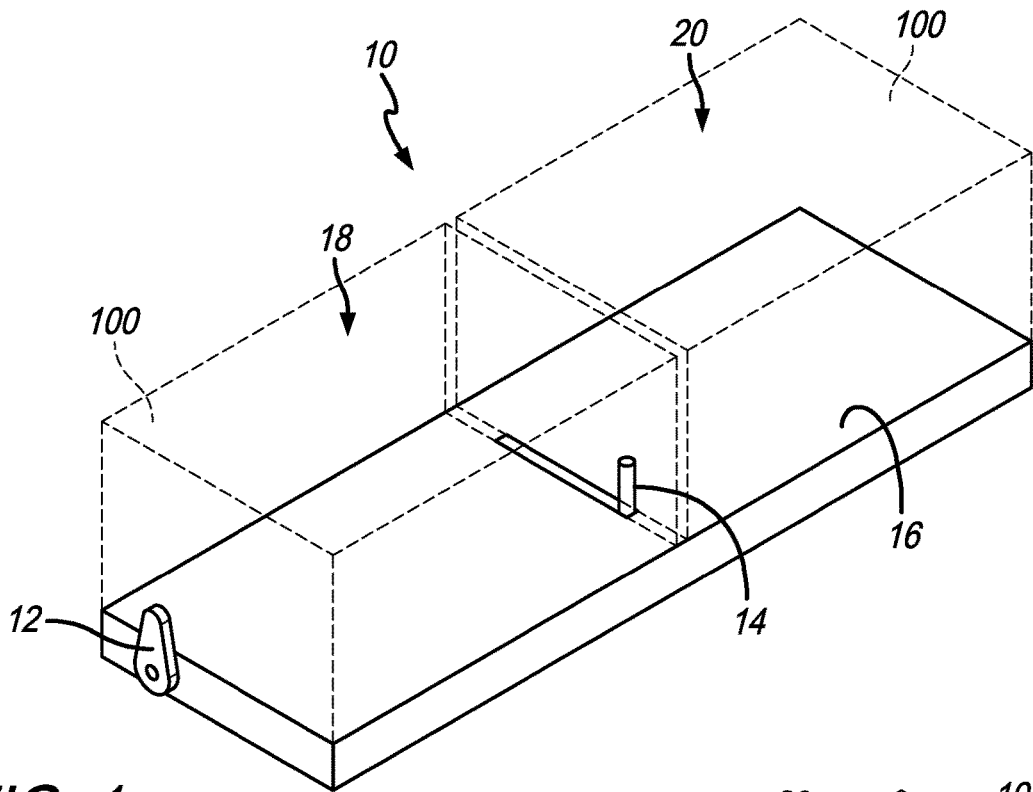
FIG. 1 is a perspective view of a retainment assembly with both the proximal and distal retainer members in the deployed position in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Figure 2:
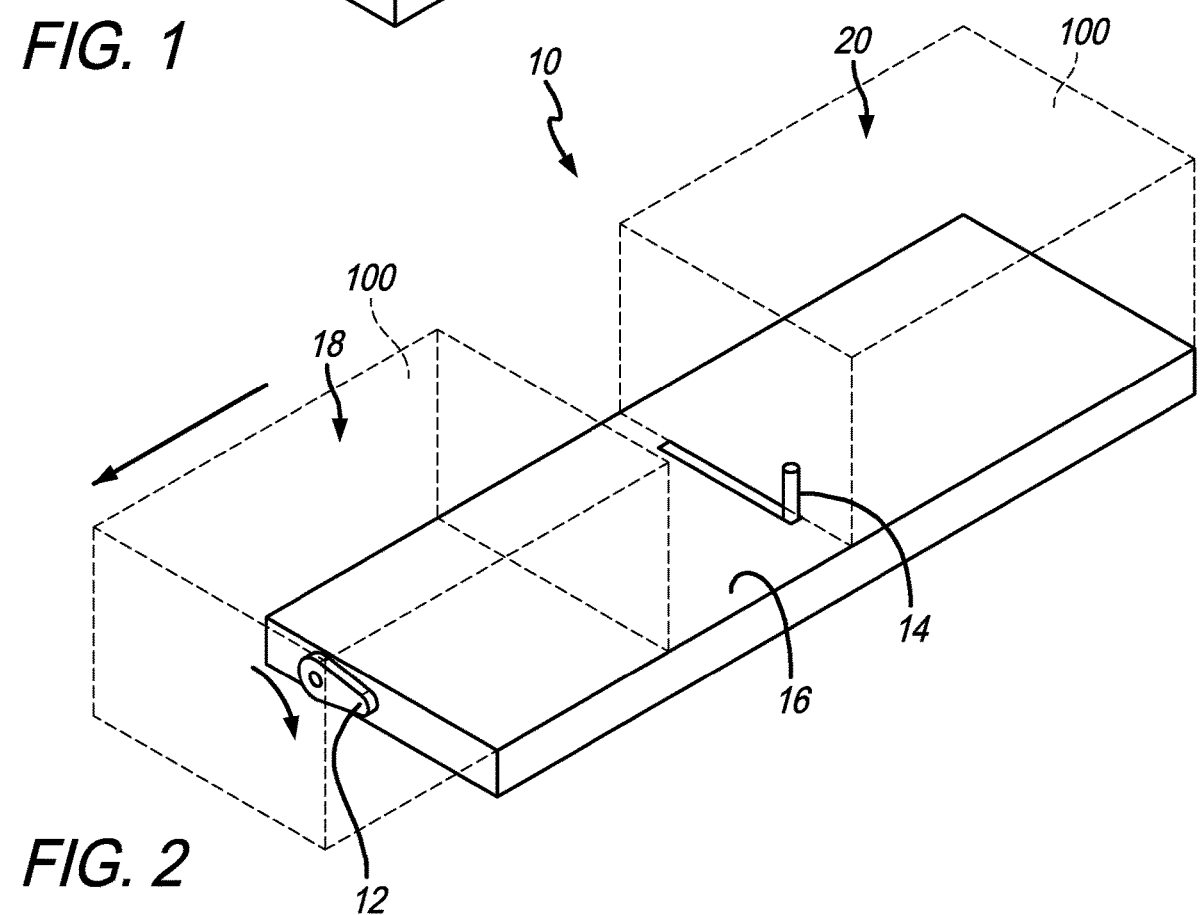
FIG. 2 is a perspective view of the retainment assembly with the proximal retainer member in the first retracted position and the distal retainer member in the deployed position.
Figure 3:
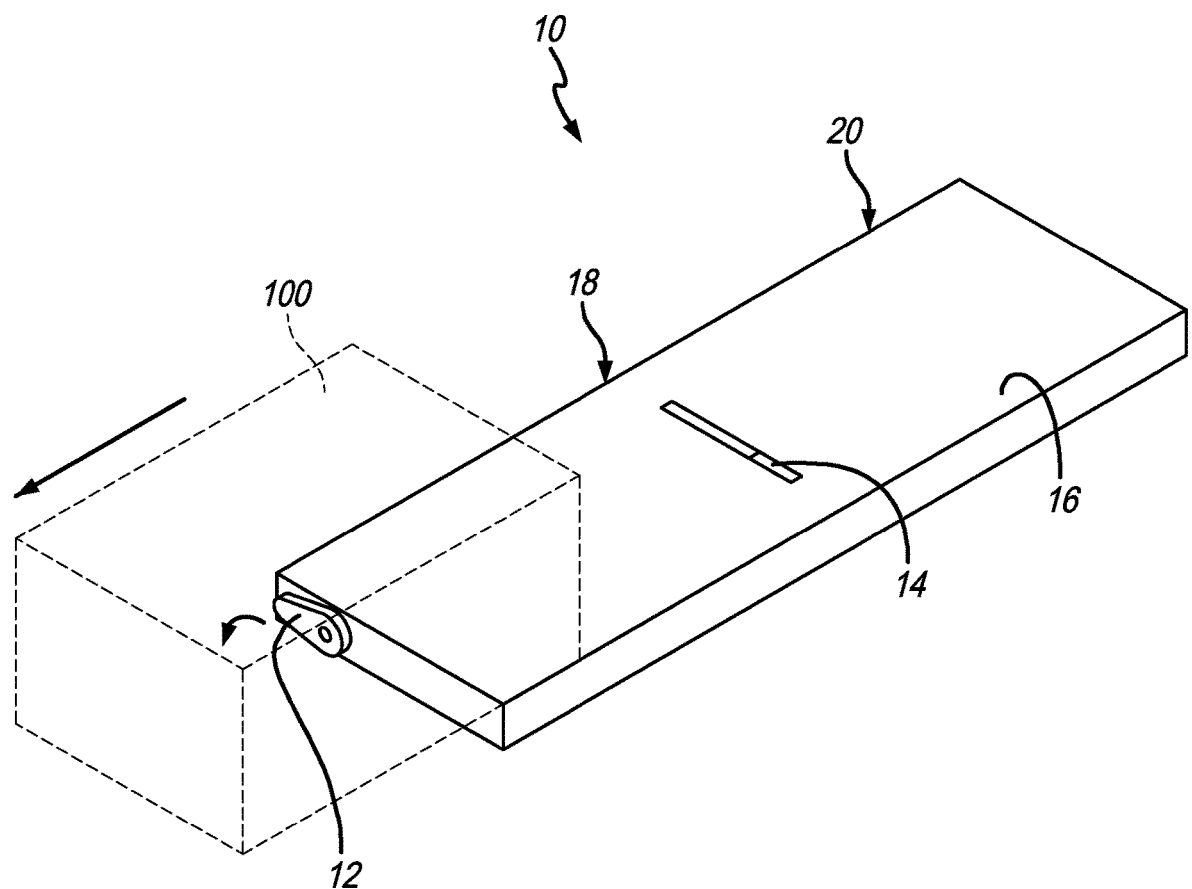
FIG. 3 is a perspective view of the retainment assembly with the proximal retainer member in the second retracted position and the distal retainer member in the retracted position.

Referring now to the drawings, which are for purposes of illustrating the present invention and not for purposes of limiting the same, the drawings show a retainment assembly 10 that includes proximal and distal retainer members 12 and 14. In a preferred embodiment, the retainment assembly 10 is used to contain or secure standard containers 100 in the galley of an aircraft. However, this is not a limitation on the present invention and the retainment assembly 10 can be used to secure other objects in place. FIGS. 1-3 show the proximal and distal retainer members 12 and 14 extending upwardly above a surface 16 to secure the standard containers 100 in place. However, the retainment assembly 10 can be oriented such that the proximal and distal retainer members 12 and 14 extend downwardly or sideways. Any orientation given in the claims refers to the orientation shown in the drawings. However, this should not be considered limiting. For example, if the retainment assembly were employed such that the retainer members extended downwardly below a surface to secure objects in place, the claims still would cover such an employment.

FIGS. 1-3 demonstrate the three states of the system where both proximal and distal retainer members 12 and 14 are in the deployed position (FIG. 1), where the proximal retainer member 12 is in the first retracted position and the distal retainer member 14 is in the deployed position (FIG. 2), and where the proximal retainer member 12 is in the second retracted position and the distal retainer member 14 is in the retracted position (FIG. 3).

Figure 4:
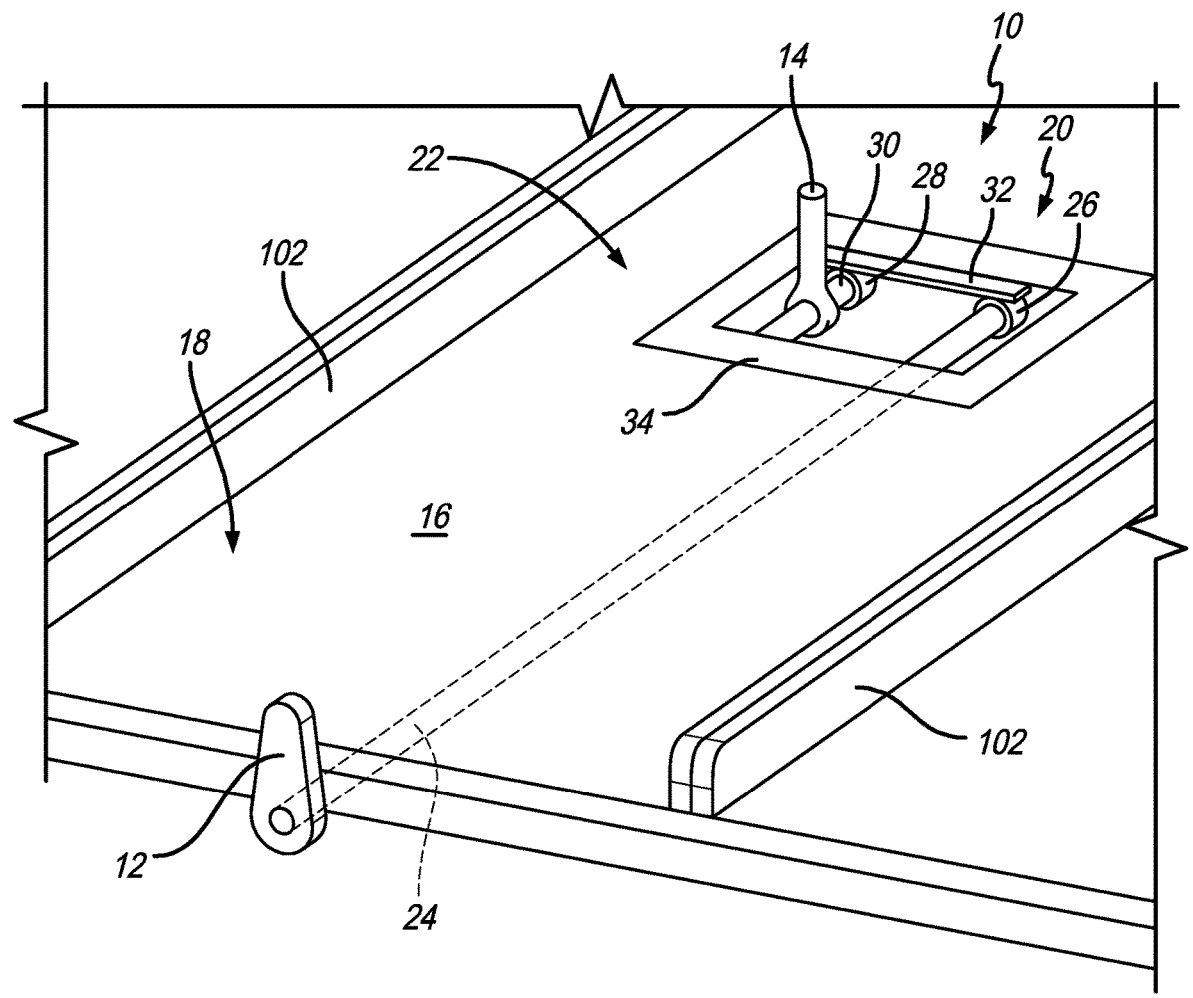
FIG. 4 is a perspective view of the retainer assembly where a rack gear is included.

As discussed above, the present invention eliminates the need for a separate retainer member located proximate to the user in order to operate the distal retainer member. Movement of the proximal retainer member 12 to the first retracted position keeps the distal retainer member 14 in the deployed position and allows the user to remove the standard container 100 from the front storage space 18 and leaves the standard container 100 in the rear storage space 20 in place, as shown in FIG. 2. Movement of the proximal retainer member 12 to the second retracted position causes the distal retainer member 14 to move to the deployed position and allows the user to remove the standard container 100 from the front storage space 18 and the standard container 100 in the rear storage space 20 in place, as shown in FIG. 3 (or just the standard container 100 in the rear storage space 20 if the front storage space is already empty). FIG. 4 shows rails 102 that can be included to partially define the first and second storage spaces 18 and 20.

As shown in FIGS. 1-3, the movement of the proximal and distal retainer members 12 and 14 between the first retracted, second retracted and deployed positions is rotational movement. However, in another embodiment, another type of movement (e.g., translational, linear) can be utilized. For example, in another embodiment, the proximal retainer member 12 can be rotated, which causes the distal retainer member 14 to move linearly upwardly and into place.

In a preferred embodiment, gearing is used to cause the movement discussed herein. Preferably, the retainment assembly 10 includes a gear assembly 22 and the proximal retainer member 12 includes a rod 24 that extends to the gear assembly 22. In a preferred embodiment, the gear assembly 22 includes a first gear 26 associated with the proximal retainer member 12 and a second gear 28 associated with the distal retainer member 14. The first gear 26 can be located on the rod 24, as shown in FIG. 4. The distal retainer member 14 can also be positioned on a rotatable rod 30 that includes the second gear 28 thereon. In a preferred embodiment, the gear assembly 22 includes a rack gear 32 that is associated with and meshes with the first and second gears 26 and 28. The gear assembly 22 can be part of a box or housing 34 that includes space or slot that is spanned by the rods 24 and 30, as is best shown in FIG. 5.

FIGS. 4-11 show embodiments of the gearing of the retainer assembly 10 and, in particular, the gear assembly 22 where a rack gear 32 is included. FIGS. 12-17 show another embodiment of the retainer assembly 10 and, in particular, the gear assembly 22 where a rack gear 32 is not included and the first and second gears 26 and 28 are meshed directly.

Generally, in both embodiments discussed above, when the proximal retainer member 12 moves from the deployed position to the first retracted position (FIGS. 6-8 and 13-15), the first gear 26 rotates and the second gear 28 does not rotate, thus leaving the distal retainer member 14 in the deployed position. And, when the proximal retainer member 12 moves from the deployed position to the second retracted position (FIGS. 6, 9-10 and 14, 16-17) the first gear 26 rotates, causing the second gear 28 to rotate, thus moving the distal retainer member 14 to the retracted position.

Figure 5:
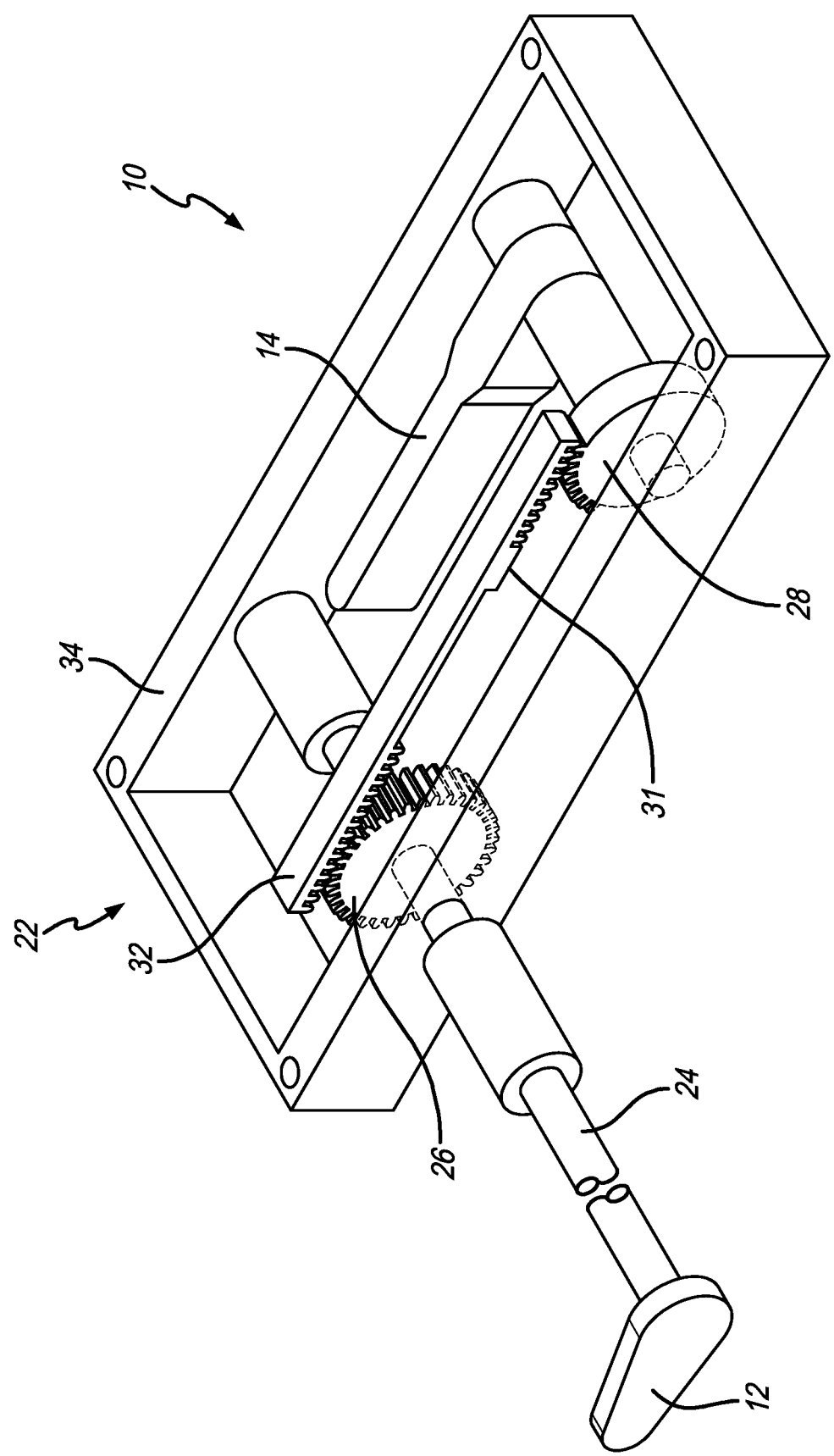
FIG. 5 is a perspective view of the gear assembly where a rack gear is included.
Figure 6:
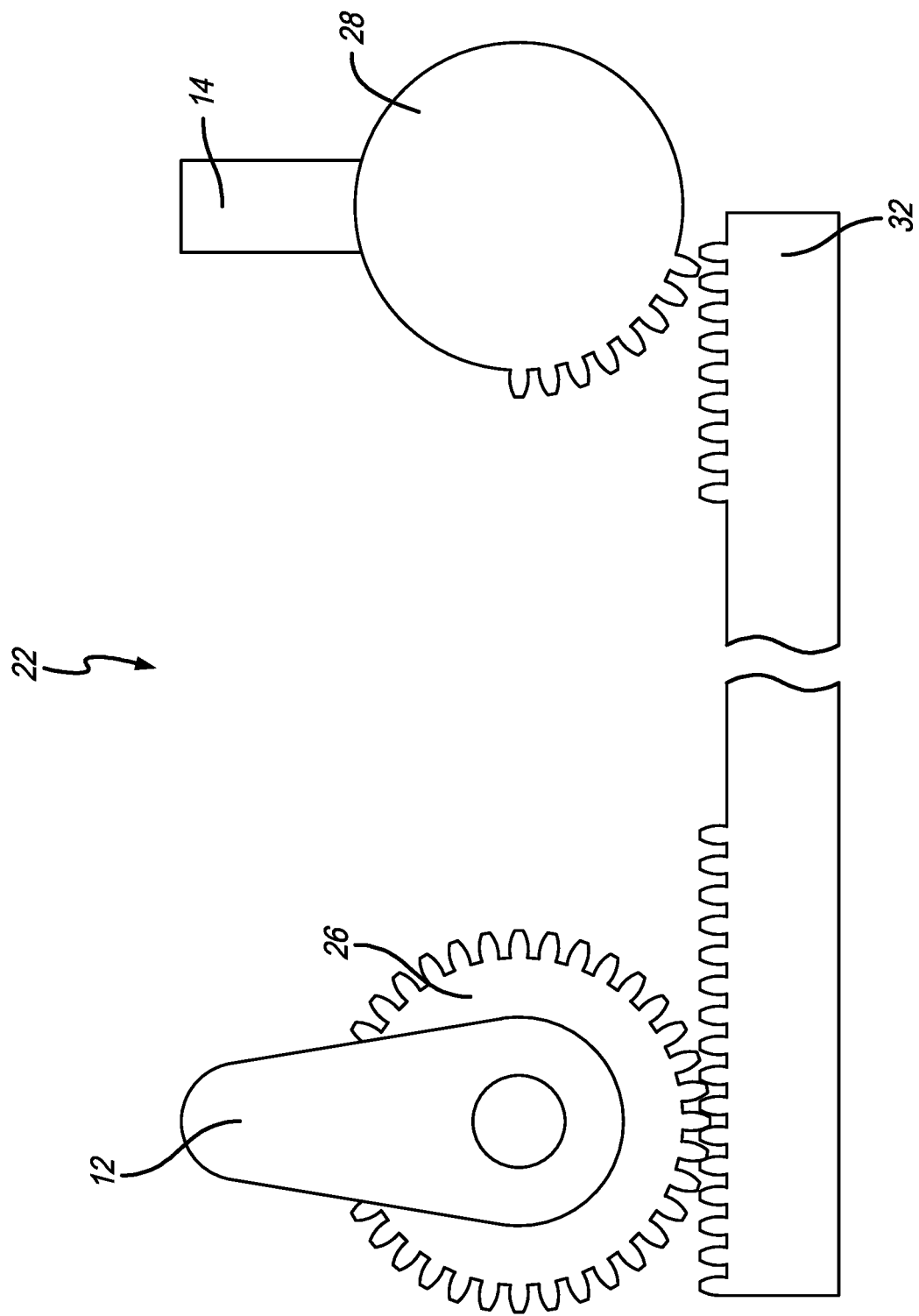
FIG. 6 is an elevational view of the proximal and distal retainer members and the gears associated therewith and showing both the proximal and distal retainer members in the deployed position.
Figure 7:
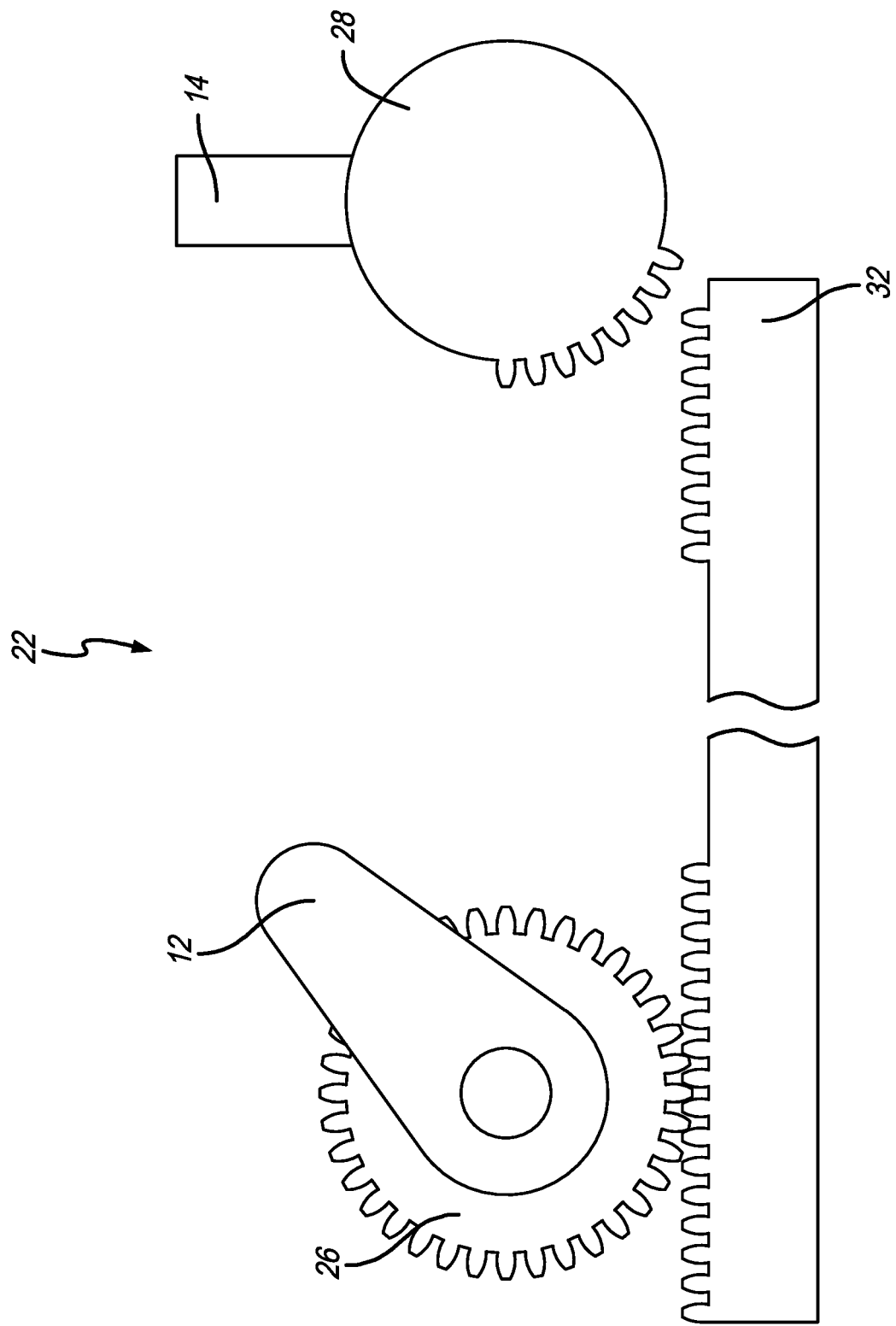
FIG. 7 is an elevational view showing the proximal retainer member between the deployed and first retracted position and the distal retainer member still in the deployed position.
Figure 8:
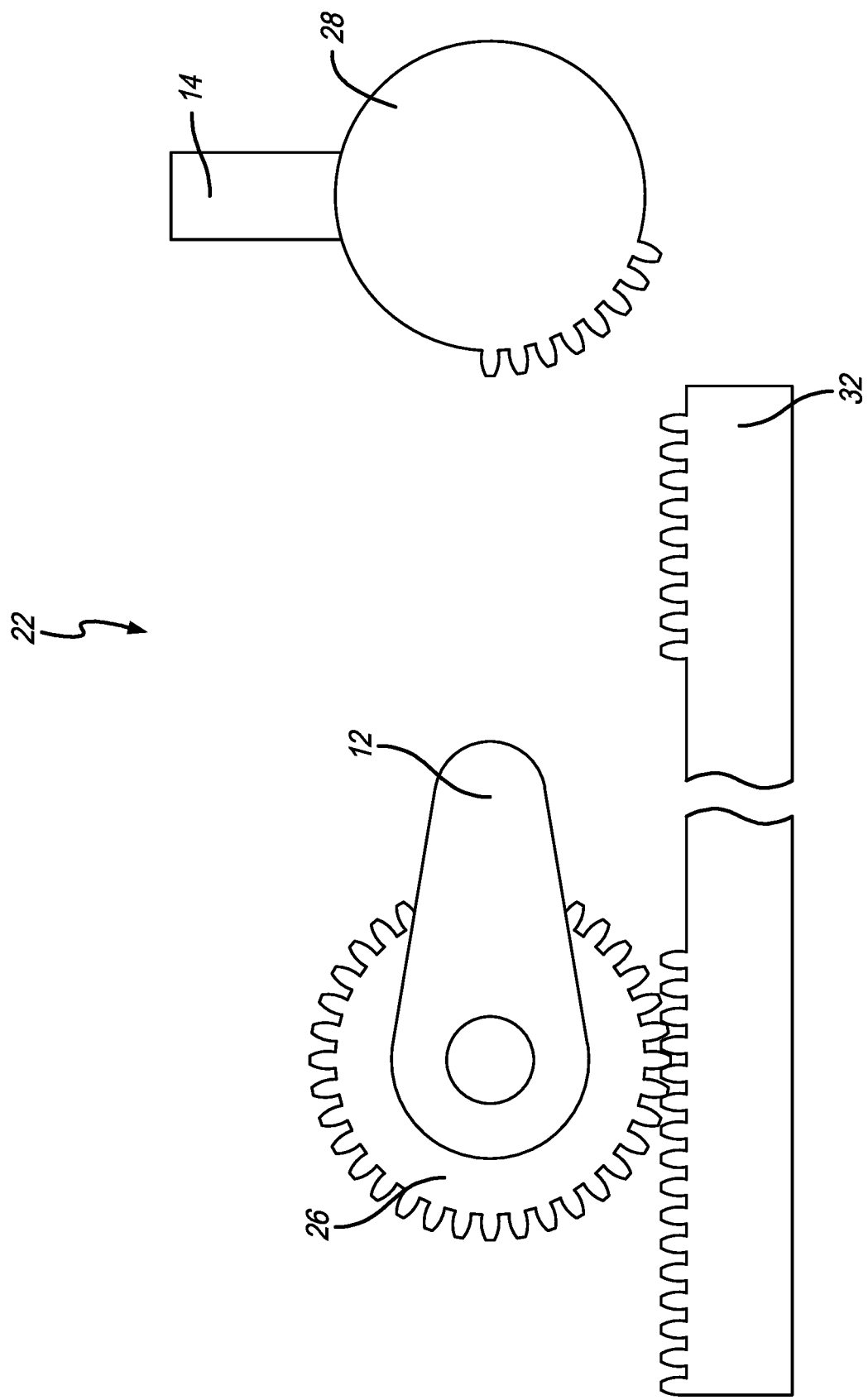
FIG. 8 is an elevational view showing the proximal retainer member in the first retracted position and the distal retainer member in the deployed position.
Figure 9:
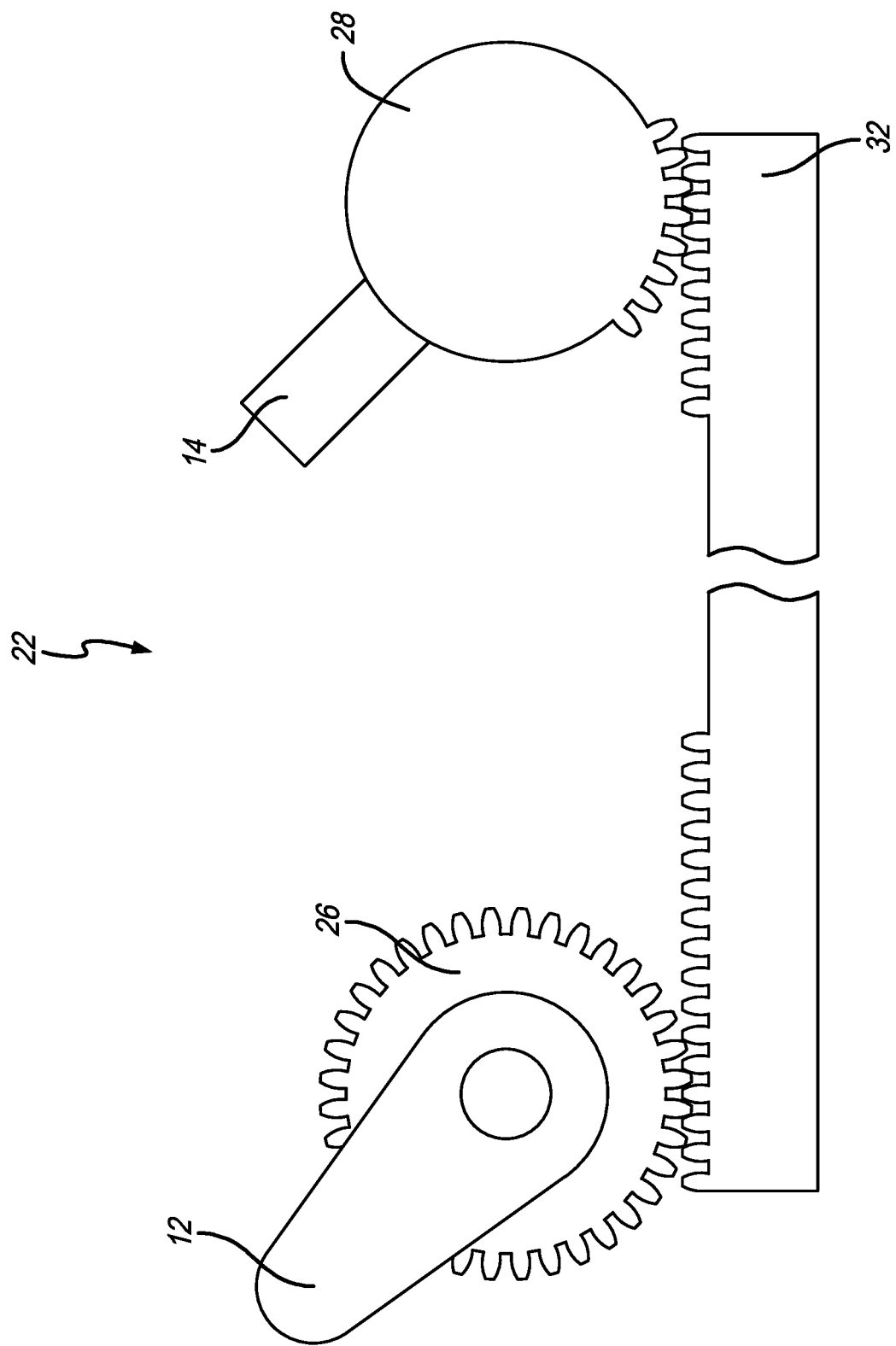
FIG. 9 is an elevational view showing the proximal retainer member between the deployed and second retracted position and the distal retainer member between the deployed position and the retracted position.
Figure 10:
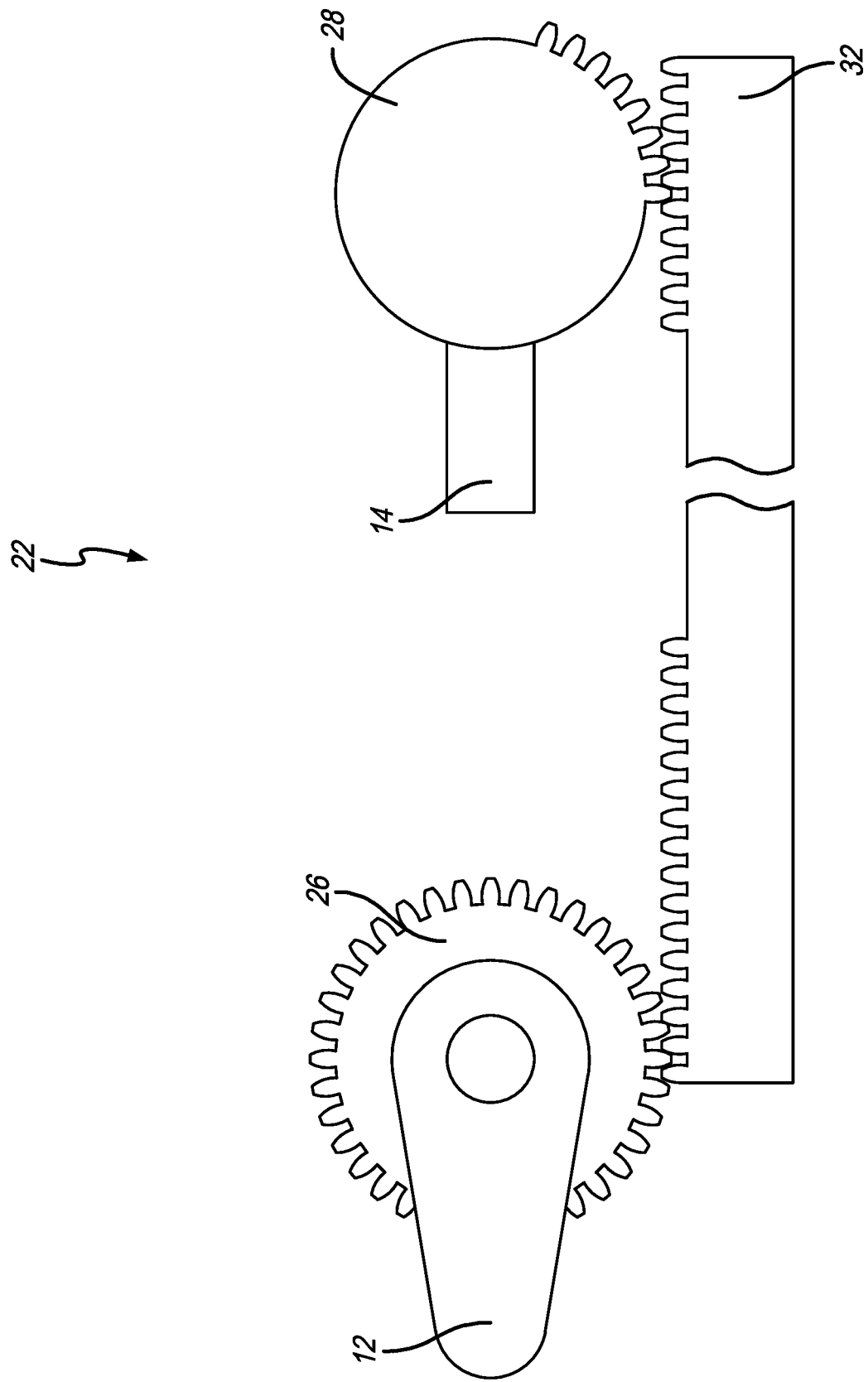
FIG. 10 is an elevational view showing the proximal retainer member in the second retracted position and the distal retainer member in the retracted position.
Figure 11:
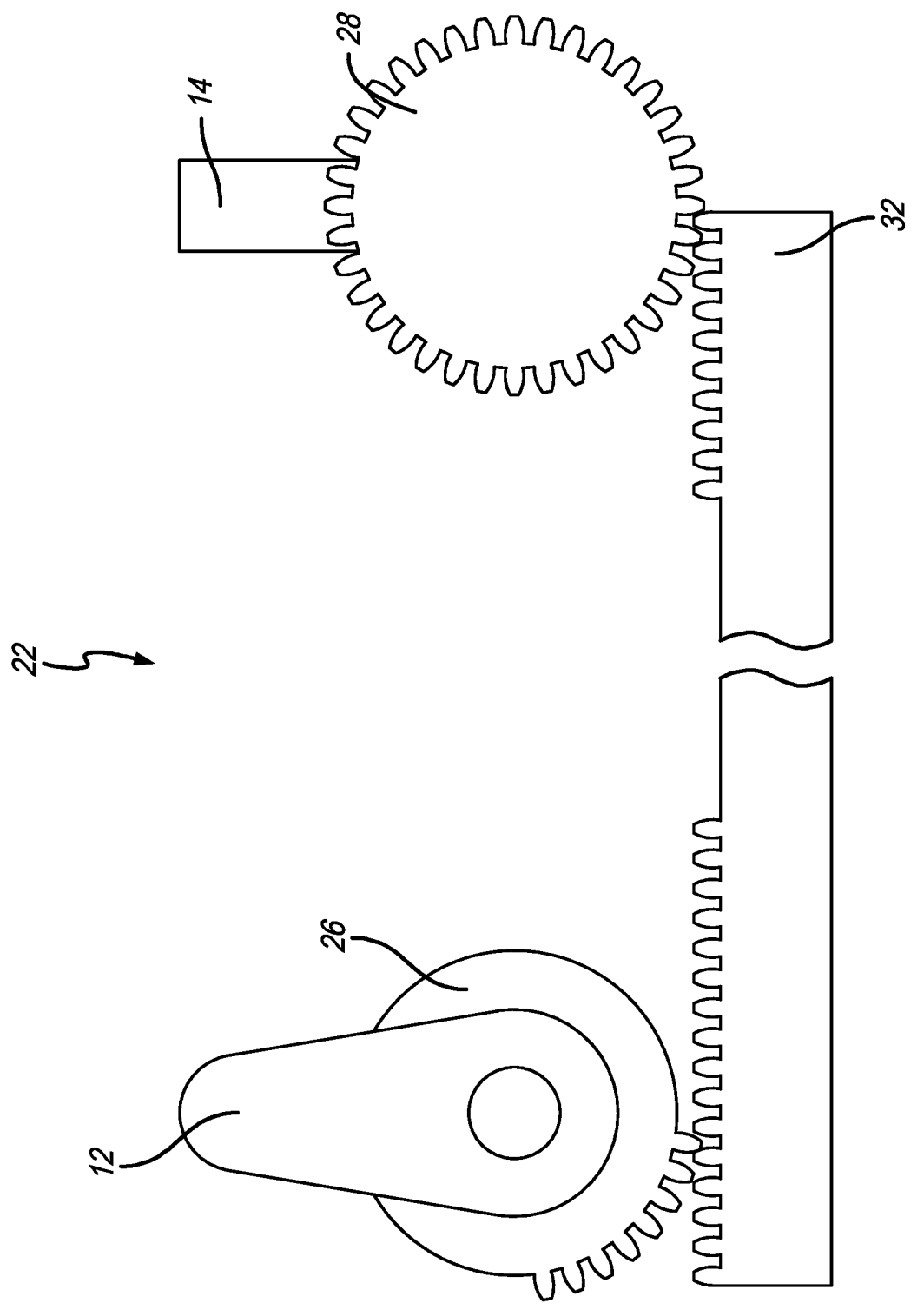
FIG. 11 is an elevational view of the proximal and distal retainer members and the gears associated therewith and showing both the proximal and distal retainer members in the deployed position in accordance with another embodiment of the present invention.
Figure 12:
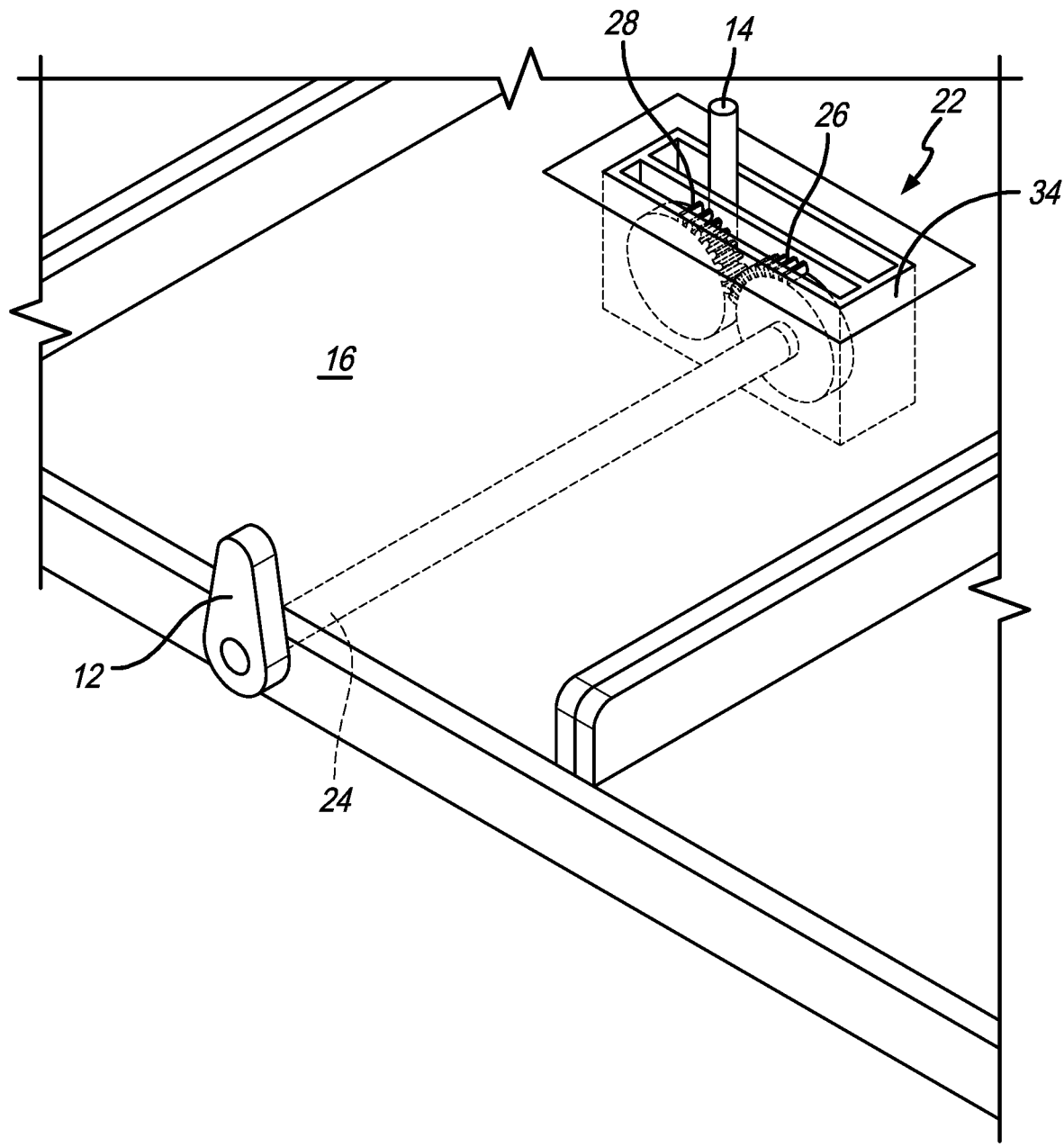
FIG. 12 is a perspective view of the retainer assembly where the gears are meshed.
Figure 13:
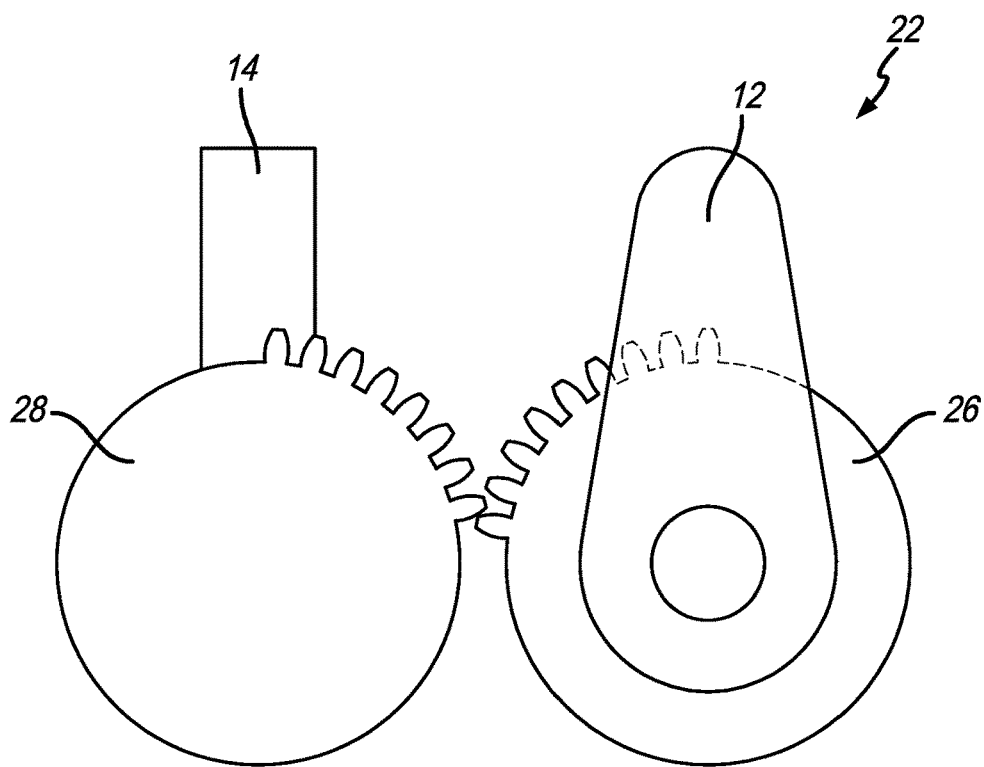
FIG. 13 is an elevational view showing both the proximal and distal retainer members in the deployed position.

With reference to FIGS. 5-11, the embodiment that includes the rack gear 32 is shown. As shown in FIGS. 7-8, as the first gear 26 rotates to the first retracted position, the gear teeth engage with the teeth on the rack gear 32. However, the second gear 28 does not have gear teeth engaged with the rack gear 32 as it moves away from the second gear 28, thus leaving the distal retainer member 14 in the deployed position. As shown in FIGS. 9-10, as the first gear 26 rotates to the second retracted position, the gear teeth engage with the teeth on the rack gear 32 and move the rack gear 32 toward the second gear 32. The teeth of the second gear 28 are engaged or mesh with the rack gear 32 as it moves away from the second gear 28, thus moving the second gear 28 (and the distal retainer member 14) to the retracted position. In FIGS. 6-10 the second gear 28 has teeth omitted so that the distal retainer member 14 does not rotate when the proximal retainer member moves to the first retracted position. However, as shown in FIG. 11, in another embodiment, the first gear 26 can include the omitted teeth to accomplish the same result. As shown in FIG. 5, the rack gear 32 can include a stop positioned between the first and second gears 26 and 28.

Figure 14:
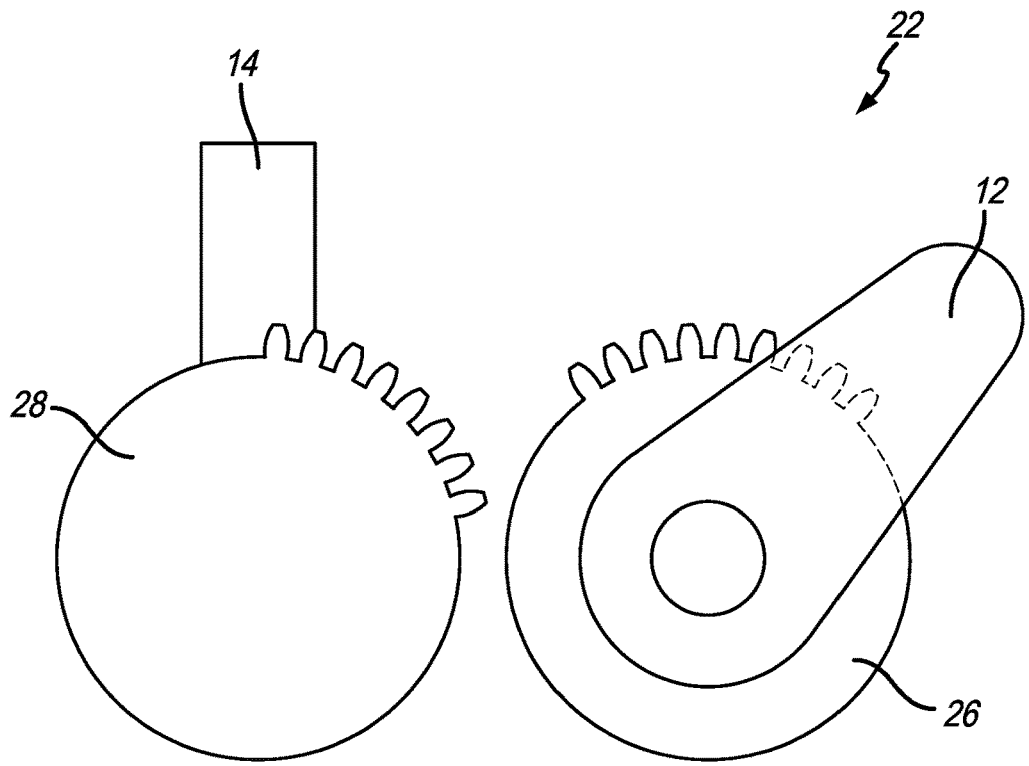
FIG. 14 is an elevational view showing the proximal retainer member between the deployed and the second retracted position and the distal retainer member in the deployed position.
Figure 15:
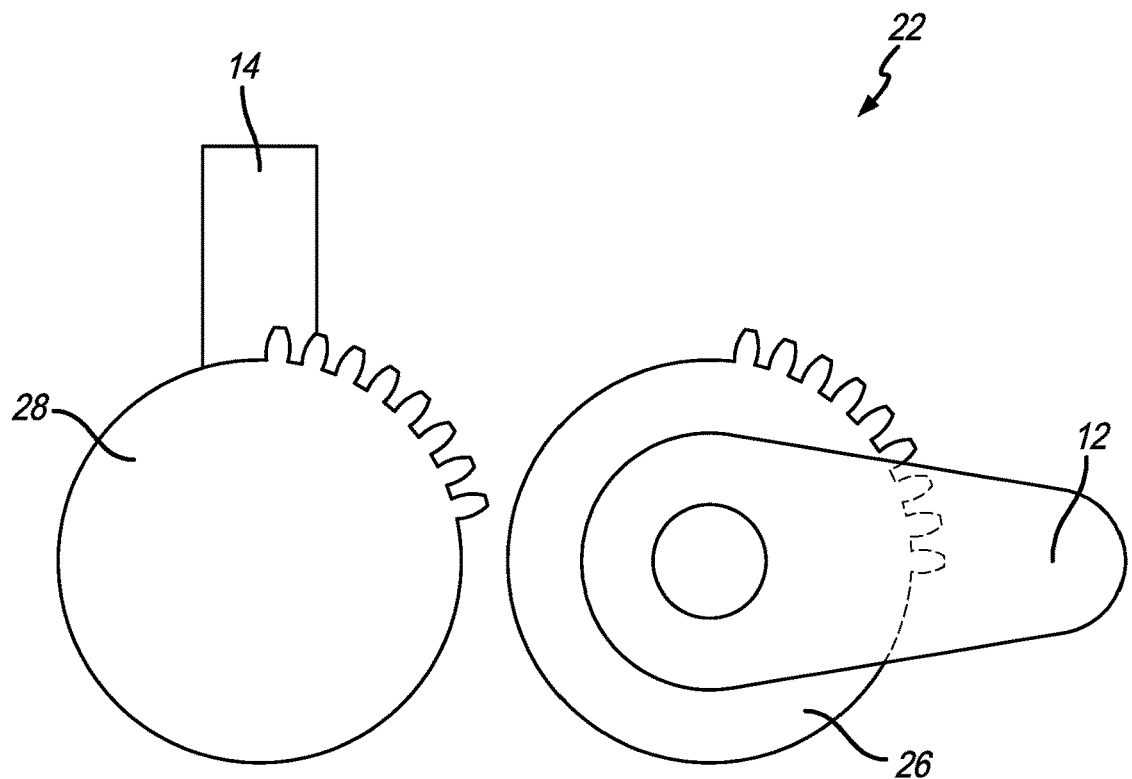
FIG. 15 is an elevational view of the distal retainer member in the deployed position and the proximal retainer member in the retracted position.
Figure 16:
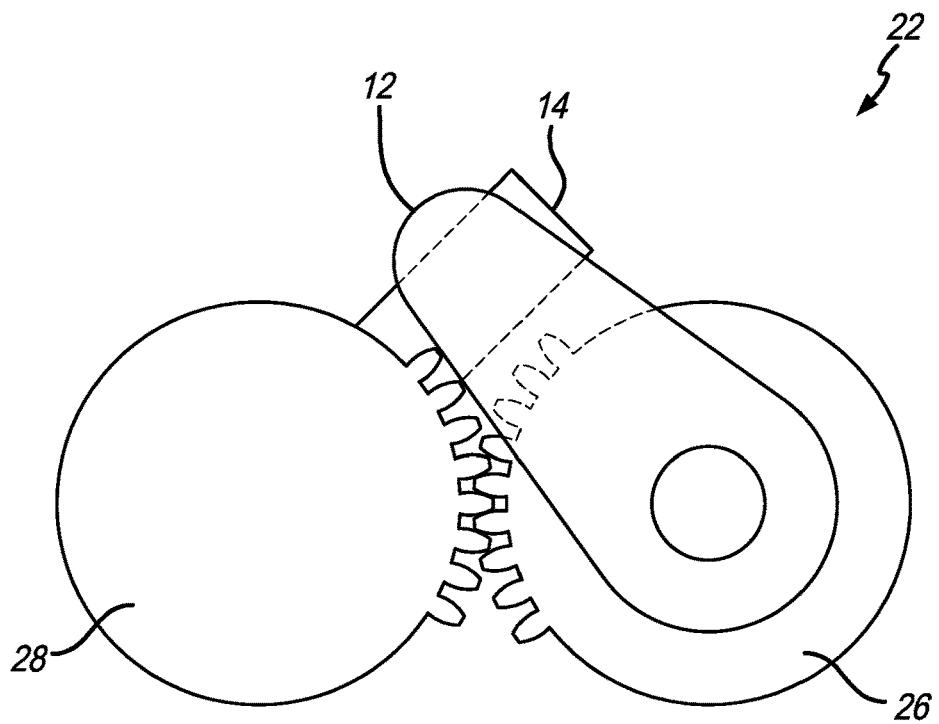
FIG. 16 is an elevational view of the proximal retainer member between the deployed and second retracted position and the distal retainer member between the deployed position and the retracted position.
Figure 17:
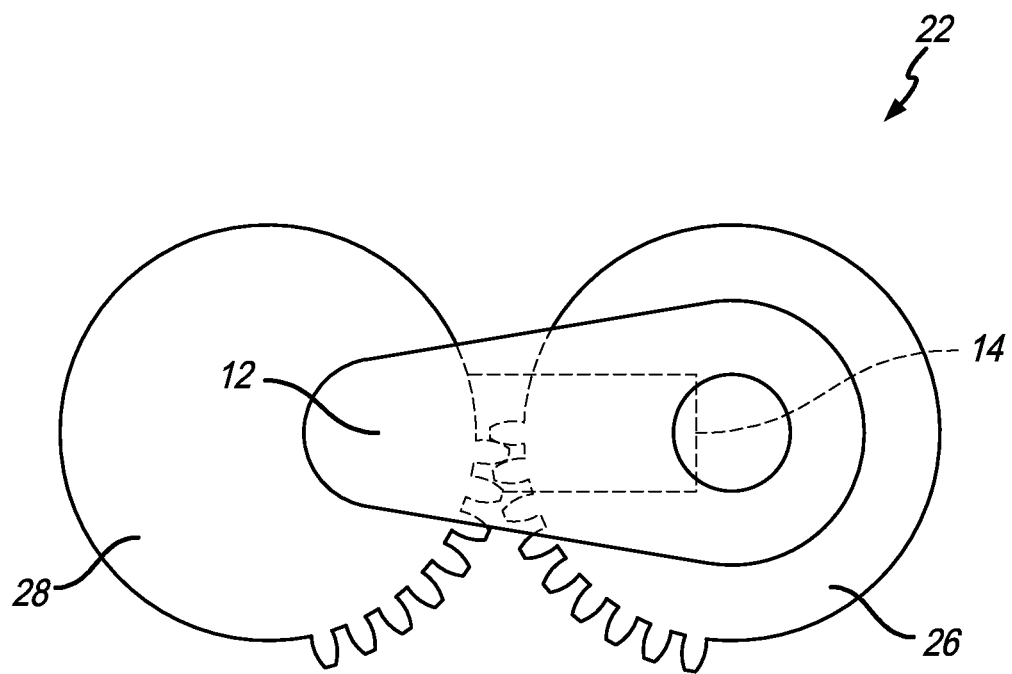
FIG. 17 is an elevational view of both the proximal retainer member and the distal retainer member in the retracted position.

With reference to FIGS. 13-17, the embodiment that omits the rack gear 32 and includes a direct connection or engagement between the first and second gears 26 and 28 is shown. As shown in FIGS. 14-15, as the first gear 26 rotates to the first retracted position, the second gear 28 does not have gear teeth engaged with the first gear 26, thus leaving the distal retainer member 14 in the deployed position. As shown in FIGS. 16-17, as the first gear 26 rotates to the second retracted position, the gear teeth on the first gear 26 engage with the teeth on the second gear 32, thus moving the second gear 28 (and the distal retainer member 14) to the retracted position. It will be appreciated that generally, sets of gear teeth that selectively mesh with other sets of gear teeth are what cause the movement described herein.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:
1. A retainment assembly comprising:
a proximal retainer member that is movable between a first retracted position, a second retracted position and a deployed position, and
a distal retainer member that is movable between a retracted position and a deployed position,
a surface,
wherein when the proximal retainer member moves from the deployed position to the first retracted position the distal retainer member does not move, wherein when the proximal retainer member moves from the deployed position to the second retracted position the distal retainer member moves from the deployed position to the retracted position, wherein in the deployed position at least a portion of the proximal retainer member is positioned above the surface and in the first and second retracted positions the proximal retainer member is positioned below the surface, and wherein in the deployed position at least a portion of the distal retainer member is positioned above the surface and in the retracted position the distal retainer member is positioned below the surface.

2. The retainment assembly of claim 1 wherein the movement of the proximal retainer member between the first retracted, second retracted and deployed positions is rotational movement.

3. The retainment assembly of claim 2 wherein the movement of the distal retainer member between the retracted position and the deployed position is rotational movement.

4. A retainment assembly comprising:
a proximal retainer member that is movable between a first retracted position, a second retracted position and a deployed position,
a distal retainer member that is movable between a retracted position and a deployed position, and
a gear assembly, wherein the proximal retainer member includes a rod that extends to the gear assembly, wherein the gear assembly includes a first gear associated with the proximal retainer member and a second gear associated with the distal retainer member,
wherein when the proximal retainer member moves from the deployed position to the first retracted position the distal retainer member does not move, and
wherein when the proximal retainer member moves from the deployed position to the second retracted position the distal retainer member moves from the deployed position to the retracted position.

5. The retainer assembly of claim 4 wherein the gear assembly further comprises a rack gear.

6. The retainer assembly of claim 5 wherein when the proximal retainer member moves from the deployed position to the first retracted position the rack gear is not meshed with one of the first gear or the second gear and the distal retainer member remains in the deployed position, and wherein when the proximal retainer member moves from the deployed position to the second retracted position the rack gear is meshed with both the first gear and the second gear and the distal retainer member moves to the retracted position.

7. The retainer assembly of claim 6 wherein when the proximal retainer member moves from the deployed position to the first retracted position the rack gear is meshed with the first gear and not the second gear and the distal retainer member remains in the deployed position, and wherein when the proximal retainer member moves from the deployed position to the second retracted position the rack gear is meshed with both the first gear and the second gear and the distal retainer member moves to the retracted position.

8. The retainer assembly of claim 6 wherein when the proximal retainer member moves from the deployed position to the first retracted position the rack gear is meshed with the second gear and not the first gear and the distal retainer member remains in the deployed position, and wherein when the proximal retainer member moves from the deployed position to the second retracted position the rack gear is meshed with both the first gear and the second gear and the distal retainer member moves to the retracted position.

9. The retainer assembly of claim 4 wherein when the proximal retainer member moves from the deployed position to the first retracted position the first gear does not mesh with the second gear and the distal retainer member remains in the deployed position, and wherein when the proximal retainer member moves from the deployed position to the second retracted position the first gear meshes with the second gear and moves the distal retainer member from the deployed position to the retracted position.

10. A retainment assembly comprising:
a proximal retainer member that is movable between a first retracted position, a second retracted position and a deployed position,
a distal retainer member that is movable between a retracted position and a deployed position,
a gear assembly, wherein the proximal retainer member includes a rod that extends to the gear assembly, wherein the gear assembly includes a first gear associated with the proximal retainer member and a second gear associated with the distal retainer member, and
a surface, wherein the rod extends beneath the surface, wherein in the deployed position at least a portion of the proximal retainer member is positioned above the surface and in the first and second retracted positions the proximal retainer member is positioned below the surface, and wherein in the deployed position at least a portion of the distal retainer member is positioned above the surface and in the retracted position the distal retainer member is positioned below the surface,
wherein when the proximal retainer member rotates from the deployed position to the first retracted position the distal retainer member does not rotate, and wherein when the proximal retainer member rotates from the deployed position to the second retracted position the distal retainer member rotates from the deployed position to the retracted position.

11. The retainer assembly of claim 10 wherein the gear assembly further comprises a rack gear.

12. The retainer assembly of claim 11 wherein when the proximal retainer member moves from the deployed position to the first retracted position the rack gear is not meshed with one of the first gear or the second gear and the distal retainer member remains in the deployed position, and wherein when the proximal retainer member moves from the deployed position to the second retracted position the rack gear is meshed with both the first gear and the second gear and the distal retainer member moves to the retracted position.

13. The retainer assembly of claim 12 wherein when the proximal retainer member moves from the deployed position to the first retracted position the rack gear is meshed with the first gear and not the second gear and the distal retainer member remains in the deployed position, and wherein when the proximal retainer member moves from the deployed position to the second retracted position the rack gear is meshed with both the first gear and the second gear and the distal retainer member moves to the retracted position.

14. The retainer assembly of claim 12 wherein when the proximal retainer member moves from the deployed position to the first retracted position the rack gear is meshed with the second gear and not the first gear and the distal retainer member remains in the deployed position, and wherein when the proximal retainer member moves from the deployed position to the second retracted position the rack gear is meshed with both the first gear and the second gear and the distal retainer member moves to the retracted position.

15. The retainer assembly of claim 10 wherein when the proximal retainer member moves from the deployed position to the first retracted position the first gear does not mesh with the second gear and the distal retainer member remains in the deployed position, and wherein when the proximal retainer member moves from the deployed position to the second retracted position the first gear meshes with the second gear and moves the distal retainer member from the deployed position to the retracted position.

\* \* \* \* \*